Dec. 13, 1955   G. MARKUS ET AL   2,726,941
ORNAMENTED ARTICLES AND METHOD OF MAKING THEM
Filed Jan. 21, 1955   2 Sheets-Sheet 2
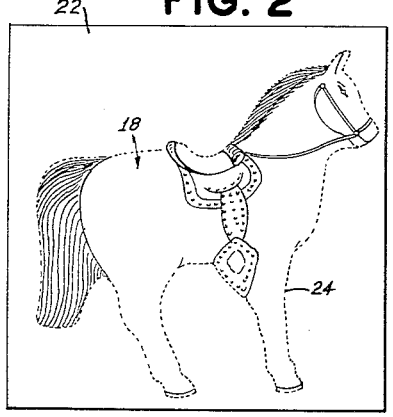
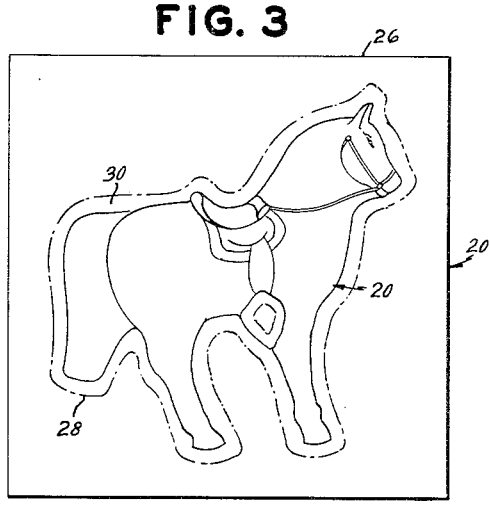
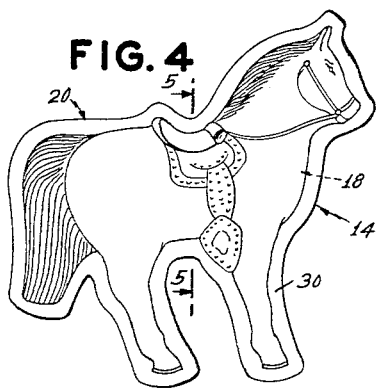
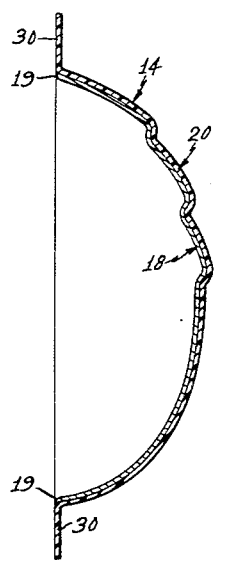
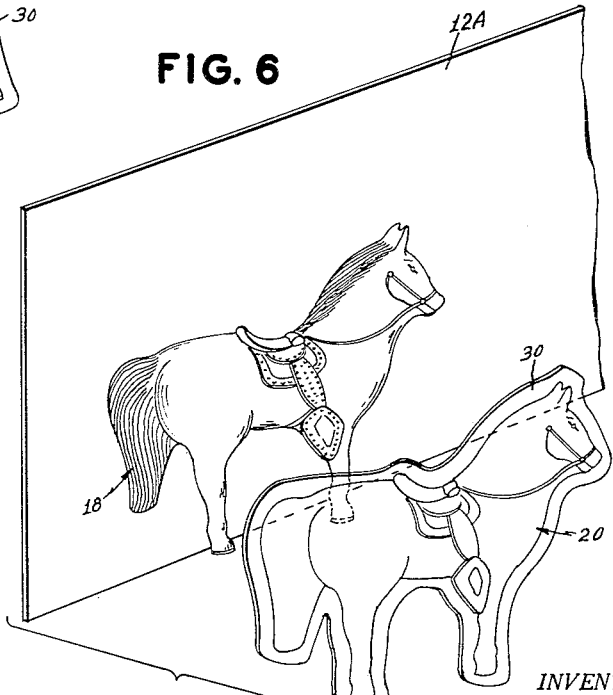
INVENTORS
George Markus
BY Martin Siegel
ATTORNEYS

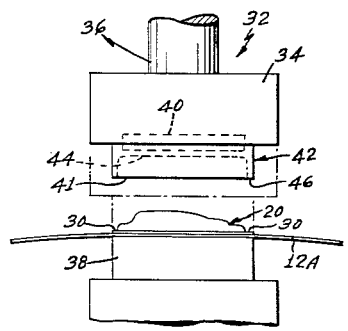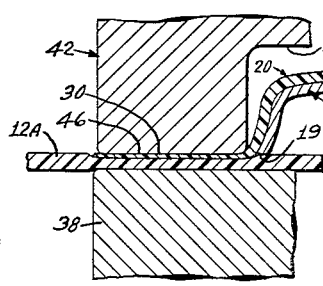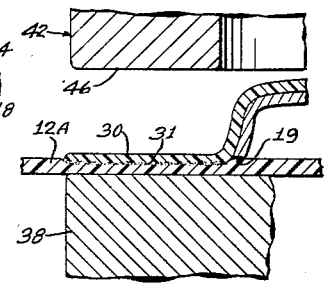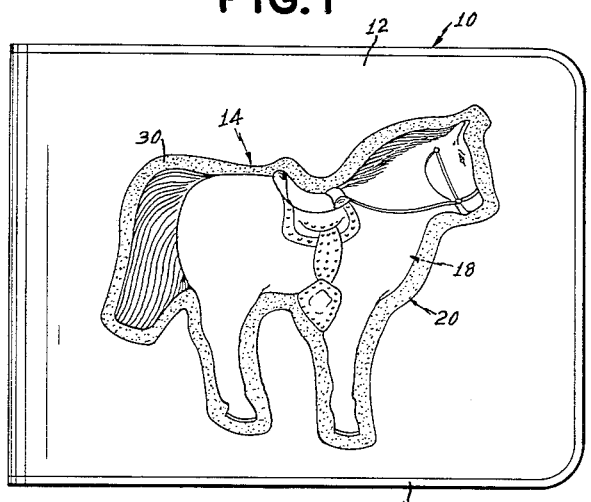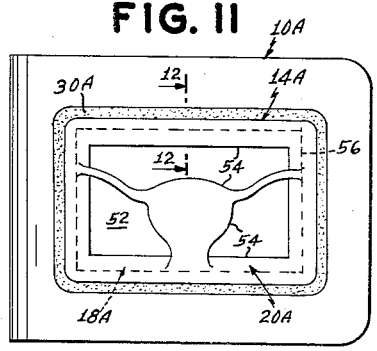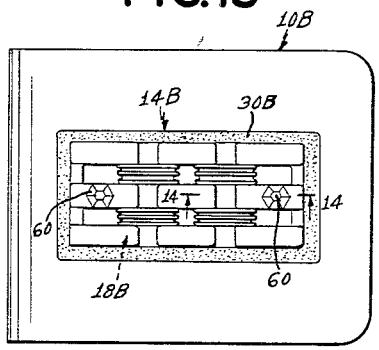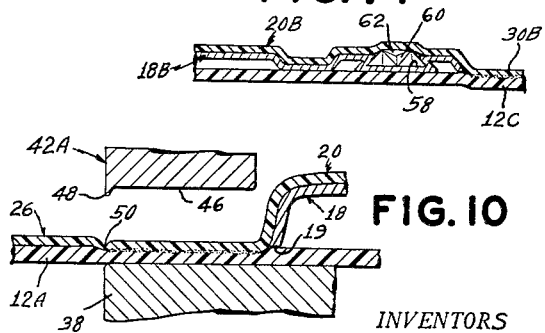

United States Patent Office 2,726,941
Patented Dec. 13, 1955

2,726,941

ORNAMENTED ARTICLES AND METHOD OF MAKING THEM

George Markus, West Orange, N. J., and Martin Siegel, Roslyn, N. Y., assignors to Aristocrat Leather Products, Inc., New York, N. Y., a corporation of New Jersey Application January 21, 1955, Serial No. 483,197

5 Claims. (Cl. 41—34)

This invention relates generally to a method of securing raised metallic ornaments on plastic sheet materials and articles thereof.

The primary object of the present invention is the provision of a generally simplified, efficient and relatively inexpensive method of attaching or securing a raised metallic element or ornament to plastic sheet material.

Another object of the present invention is to provide a method for securing raised ornaments to plastic sheet material walls or surfaces which method will not result in the impairment of or damage to said walls or surfaces, such as that which results from a stitching operation or from the use of adhesives.

Another object of the present invention is to secure raised metallic ornaments to such articles having plastic sheet material walls by a heat-sealing process.

Another object is the provision of means for securing, in one heat sealing operation, a metallic ornamental article, and an associated ornamental element to a plastic sheet material.

A further object is the provision of a method for attaching metallic ornamental elements to a plastic sheet material which method can be practiced by the utilization of conventional apparatus.

The above and other objects, features and advantages of the present invention will be more fully understood from the following description considered in connection with the accompanying illustrative drawings.

In the drawings which illustrate the best mode now contemplated by us of carrying out our invention:

Fig. 1 is a side elevation of a wallet which is provided with a raised metallic ornament, pursuant to the present invention;

Fig. 2 illustrates a sheet of metallized plastic material with a portion thereof molded into a raised ornament;

Fig. 3 illustrates a sheet of plastic material with a portion thereof molded into a raised form complementary to the molded portion of Figure 2;

Fig. 4 illustrates the molded portions of Figures 2 and 3 in assembled relation;

Fig. 5 is a sectional view, on an enlarged scale, taken on the line 5—5 of Figure 4;

Fig. 6 is an exploded view of plastic sheet material members provided with a raised metallic ornamentation;

Fig. 7 is a view, in side elevation, of a heat-sealing press apparatus showing a plastic sheet material positioned on the bed thereof and a raised metallic ornamentation positioned on the plastic sheet material preparatory to the securement of the ornamentation on the plastic sheet material;

Fig. 8 is a fragmentary sectional view, on an enlarged scale, showing the die of the heat sealing press in operative position for securing the ornamentation on the plastic sheet material;

Fig. 9 is a view similar to Figure 8, showing the die in elevated position subsequent to the heat sealing operation;

Fig. 10 is a view similar to Figure 9, and illustrates a modification in the method of the present invention;

Fig. 11 is a view similar to Figure 1 of a wallet provided with raised ornamentation which includes a plurality of ornamental elements;

Fig. 12 is a fragmentary sectional view, on an enlarged scale, taken on the line 12—12 of Figure 11;

Fig. 13 is a view similar to Figure 1, of a wallet provided with still another type of raised ornamentation; and Fig. 14 is a sectional view, on an enlarged scale, taken on the line 14—14 of Figure 13.

Referring now to Figures 1–9 of the drawings in detail, there is illustrated in Figure 1 an article of manufacture 10 which is provided with a wall or surface part 12 formed of plastic sheet material 12A (Fig. 6) on which there is secured a raised ornamental assembly, or raised ornamentation, generally designated by the reference numeral 14, said assembly being secured thereto by the method to be described in detail hereinafter. As here shown, the article 10 is illustrated, by way of example and not by way of limitation, as being constituted by a wallet, of conventional construction, the opposing outer walls of the wallet being formed preferably of vinyl plastic, or other suitable plastic sheet material and said walls of the wallet being secured together, in well-known manner, by a heat-sealing operation to define a peripheral bond or seal 16. However, it will be understood that a wallet is utilized in connection with the description of the present invention, by way of example only, and that the raised ornamental assembly 14 may be provided on other types of articles which have a wall or surface part thereof formed of plastic sheet material.

As best illustrated in Figures 4, 5 and 6, the ornamental assembly 14 is constituted by a raised metallized ornamental element 18 and by a complementary securing or sealing transparent element 20, formed preferably of transparent vinyl plastic sheet material which is heat sealable to the vinyl plastic material of wall 12 of wallet 10. In forming the ornamental element 18, we prefer to use metallized sheet material 22 (Fig. 2) which is constituted by a thin plastic sheet material, the latter being coated with metallic particles, in any well-known conventional manner, for example and not by way of limitation, by a vacuum plating process. The sheet material, which is plated with the metal particles, may be formed of any suitable plastic, for example and not by way of limitation, any acetate or butyrate, or polystyrene. The raised ornamental metallized element 18 is originally defined in the metallized sheeting 22 by being vacuum molded therein. It is then severed, or die cut from the remainder of the sheet material along the outline of the molded portion, as indicated by the broken line 24. The securing element 20 of the ornamental assembly is formed preferably by a vacuum molding operation from the plastic sheet material. The molded portion of the sheet material 26 is then severed or die cut therefrom along the outline indicated by the reference numeral 28, to provide the element 20 with a continuous peripheral flange 30, for a purpose hereinafter described. It will be understood that member 20 may be translucent instead of perfectly transparent and while it is preferably water white or clear it may be of any desired color.

As previously indicated, the metallized or metallic element 18 and the transparent or light permeable securing element 20 of the ornamental assembly 14 are complementary to each other. More specifically, said elements are complementary in surface contour with the covering or securing element 20 being slightly larger in dimensions than the metallized element 18 so that the latter can be received within and be encompassed by the covering element, as best illustrated in Figure 5, wherein it will be noted that said elements are in continuous surface contact with each other. It is within the scope of the present invention to insert the metallized element 18 into the securing element 20 either before or after the latter is severed from the sheet material 26. It is also within the scope of the present invention to form the ornamental element 18 from any suitable metal or metal alloy, as by a molding or casting operation, and the terms "metallized ornamental element," "metallized element," "metallic ornamental element," and "metallic element" as used herein, are intended to have a generic connotation and to include ornamental elements, formed of sheet material, whether plastic or otherwise, having metallic material incorporated therewith or coated thereon, as well as ornamental elements which are formed of metal or metal alloys.

The apparatus 32 which is utilized for the practice of the present invention in the securement or bonding of the ornamental assembly 20 to the plastic sheet material 12A of the article 10, is in the main, a conventional dielectric heat-sealing apparatus. Said apparatus includes a head 34 mounted at the end of a vertically reciprocable ram 36 and a stationary bed or die 38. It will be understood that the ram 36 is mounted for vertical reciprocation in any suitable manner whereby to vertically reciprocate the head 34 relative to its companion stationary bed 38. The head 34 is provided with conventional electronic equipment 40 to effect a heat sealing operation. A die 42 is mounted on the lower end of the head 34, in any suitable manner. The die-face 41 of the die 42 is recessed, as at 44, to accommodate the ornamental assembly 20, and includes a peripherally continuous edge or surface 46 which surrounds the recess, and which is complementary to the peripheral flange 30 on the covering element 20.

In practicing the method of the present invention, the metallic ornamental element 18 and the securing element 20 are each molded from suitable material, as previously described, and assembled, as illustrated in Figs. 4 and 5 with the metallic element encompassed by the securing element in substantially continuous surface-to-surface abutment. The plastic sheet material 12A is disposed on the die or bed 38 of the press 32, as illustrated in Figure 7. The ornamental assembly 14 is then disposed on the sheet material 12A so that the peripheral flange or edge 30, which extends laterally outwardly of marginal periphery 19 of the element 18, is in abutment with said sheet. The ram 36 is then reciprocated vertically downwardly so that the peripheral edge 46 of the die face engages and presses the upper surface of the flange 30, as best illustrated in Figure 8, with the remainder of the assembly 14, inwardly of the flange, extending into the recess 44. The electronic equipment 40 is now energized to heat seal the flange 30 to the compatible material of the sheet 12A, as illustrated at 31 in Figure 9, the head 34 being retracted at the termination of the heat-sealing operation. The bonding or sealing of the flange 30 to the sheet 12A, about and adjacent to the marginal periphery 19 of the raised metallic ornamental element 18, secures the latter in position on the plastic sheet material 12A. The ornamented sheet material 12A may then be utilized, in any suitable manner, to form the wall 12 of the wallet 10 or to form a surface part in any other suitable article of manufacture.

Pursuant to the modification illustrated in Fig. 10, the covering element 20 may be die cut from the plastic sheet material 26 which may be of indeterminate contour in the same operation in which the covering element is heat-sealed to the sheet material 12A. Pursuant to the present modification, the peripheral heat-sealing edge 46 of the die 42A is provided at its periphery with a sharpened projection 48. Said projecting edge portion 48 is adapted to form a tear edge 50 in the plastic sheet material 26 along the outline 28, illustrated in Figure 3. This results from the fact that the projecting edge 48 is adapted to penetrate into the plastic sheet material 26 a sufficient amount to define said tear edge 50 along the outline 28.

Consequently, it will be apparent that if the die 42A, provided with the projection 48, is utilized in the press 32, in place of the die 42, the heat-sealing operation will provide a tear edge 50 along the outline 28, in addition to sealing the flange portion 30 to the sheet material 12A about the marginal periphery 19 of the raised metallic element 18. The sheet 12A is then separated from the sheet 26 by tearing the latter along the tear line 50.

Referring now to Figures 11 and 12, there is illustrated another embodiment of the present invention pursuant to which provision is made for the raised decorative assembly 14A includes an additional decorative element. More specifically, the decorative assembly 14A as here shown, comprises a raised metallic decorative element 18A superposed on a flat decorative element 52, and an overlying securing or bonding element 20A provided with a flange 30A. The metallic element 18A is formed from metallized sheet material, in the same manner as previously described in connection with the decorative element 18. However, instead of having surface continuity, as in the case of the element 18, the element 18A is molded to provide a discontinuous or interrupted surface therefor, so as to define the surface discontinuities or interrupted portions 54. As here shown, the decorative element 52 is a planar member, preferably formed of plastic or other suitable material, which underlies the decorative element 18A, portions of the latter being in overlying abutment therewith, as best illustrated in Figure 12. The securing element 20A is formed in the same manner from colorless plastic sheet material, as in the case of the previously described securing element 20. However, the securing element 20A is also molded with surface discontinuities or surface interruptions which coincide or register with the surface discontinuities or interruptions 54 in the metallic element 18A with which the securing element 20A is complementary except, that it is of slightly larger dimension. Consequently, it will be understood that, as previously described in connection with the assembly 14, the metallic ornamental element 18A fits into and is encompassed by the securing element 20A, with the decorative element 52 engaged inwardly of the peripheral edge 56 thereof by the metallic element 18A, and with said peripheral edge 56 abutting the metallic element 18A adjacent the marginal periphery 19 of the latter, as illustrated in Figure 12. With the decorative assembly 14A disposed in position on the surface of the plastic sheet material 12B as illustrated in Figure 12, the flange 30A is heat-sealed to the sheet material 12B in the manner previously described in connection with the assembly 14, to secure the assembly 14A in position thereon, to form a raised surface decoration thereon. The decorated sheet material 12B may then be utilized to form a wall or surface of the wallet 10A, or to form a wall or surface part for any other suitable article of manufacture.

Referring now to Figures 13 and 14, there is illustrated another embodiment of the present invention pursuant to which provision is made for a decorative assembly 14B as illustrated on the wallet 10B. Pursuant to the present embodiment, the decorative assembly 14B is substantially similar to the previously described decorative assembly 14, in that it is also provided with a raised metallized decorative element 18B and a complementary overlying securing element 20B which encompasses the decorative element in substantially continuous surface-to-surface abutment therewith, said securing element being provided with a flange 30B which is heat sealed to a plastic sheet material 12C. Pursuant to the present embodiment, the metallic element 18B, when molded, is provided with recessed portions 58, as best illustrated in Figure 14, which are adapted to receive decorative inserts 60, such as for example and not by way of limitation, simulated or artificial jewels, such as, for example and not by way of limitation, artificial diamonds, glass beads, rhinestones, etc. The securing element 20B may, when molded, be provided with recessed portions 62, which cooperate with the recesses 58 to securely retain the decorative elements 60 in embedded disposition between the elements 18B and 20B when the assembly 14B is secured in position on the plastic sheet material 12C. Consequently, the highly decorative assembly 14B may be provided as a surface decoration for a wallet or similar article 10B, when the sheet member 12C constitutes a wall or surface portion thereof.

This application is a continuation in part of U. S. Patent No. 2,710,046, assigned to the assignee hereof.

While we have shown and described the preferred embodiments of our invention, it will be understood that various changes may be made in the present invention without departing from the underlying idea or principles of the invention within the scope of the appended claims.

Having thus described our invention, what we claim and desire to secure by Letters Patent, is:

1. An ornamental applique assembly comprising a plastic sheet material member, an ornamental applique element positioned in unsecured relation on the surface of said member, said element being formed of a material which is normally non-heat-sealable to said sheet material member, and a light permeable element formed of plastic sheet material overlying and encompassing said ornamental element, said light permeable element being molded to conform to the underlying adjacent surface of said element and having a peripheral edge heat sealed in position on said sheet material member to retain said applique element in position on the surface of said sheet material member without impairment of either said applique element or said sheet material member.

2. An ornamental applique assembly comprising a thermoplastic material member, an ornamental applique element positioned in unsecured relation on the surface of said member, said element being formed of a material which is normally non-heat-sealable to said sheet material member, and a light permeable element formed of thermoplastic sheet material overlying and encompassing said ornamental element, said light permeable element having an inner surface contour complementary to the underlying adjacent surface of said element and having a flat peripheral edge heat sealed in position on said sheet material member to retain said applique element in position on the surface of said sheet material member without impairment of either said applique element or said sheet material member.

3. An ornamental applique assembly comprising a thermoplastic sheet material member, an ornamental applique element of predetermined peripheral edge contour and raised surface contour positioned in unsecured relation on the surface of said member, said element being formed of a material which is normally non-heat-sealable to said sheet material member, and a light permeable element formed of thermoplastic sheet material comprising a raised part overlying said ornamental element, said raised part having an inner surface contour complementary to the underlying raised surface contour of said element and having a substantially continuous peripheral flange extending about the peripheral edge of said ornamental element heat sealed in position on said sheet material member to retain said applique element in position on the surface of said sheet material member without impairment of either said applique element or said sheet material member, said flange having a peripheral marginal edge terminating inwardly of the outer edge of said sheet material member.

4. The method of providing an ornamental applique element on the surface of a thermoplastic part with the applique element being normally non-heat sealable to said part, said method comprising positioning the applique element on said thermoplastic part between the latter and a light permeable member with a part of the light permeable member extending outwardly of the outer edge of the applique element and terminating inwardly of the outer edge of the thermoplastic part, and heat sealing said part of the light permeable member to said thermoplastic part inwardly of the outer edge of said thermoplastic part adjacent to and outwardly of the outer edge of the applique element.

5. The method of providing an ornamental applique element on the surface of a thermoplastic part with the applique element being normally non-heat-sealable to said part and having a raised surface contour, said method comprising positioning the applique element on said thermoplastic part between the latter and a light permeable member molded to conform to the applique element with the under surface of the light permeable member in surface-to-surface engagement with the underlying raised surface contour of the applique element and with a part of the light permeable member extending outwardly of the outer edge of the applique element and terminating inwardly of the outer edge of the thermoplastic part, and heat sealing said part of the light permeable member to said thermoplastic part inwardly of the outer edge of said thermoplastic part adjacent to and outwardly of the outer edge of the applique element.

References Cited in the file of this patent

UNITED STATES PATENTS

| 1,282,612 | Massey | Oct. 22, 1918 |
| 2,169,930 | Shuster | Aug. 15, 1939 |
| 2,214,842 | Sweet et al. | Sept. 17, 1940 |
| 2,282,168 | Cunnington | May 5, 1942 |
| 2,330,497 | Larmour | Sept. 28, 1943 |
| 2,609,278 | Eyles | Sept. 2, 1952 |
| 2,710,046 | Markus et al. | June 7, 1955 |